(No Model.)  2 Sheets—Sheet 1.
E. O. McGLAUFLIN.
ROLL-OFF LUMBER WAGON.
No. 600,646.  Patented Mar. 15, 1898.
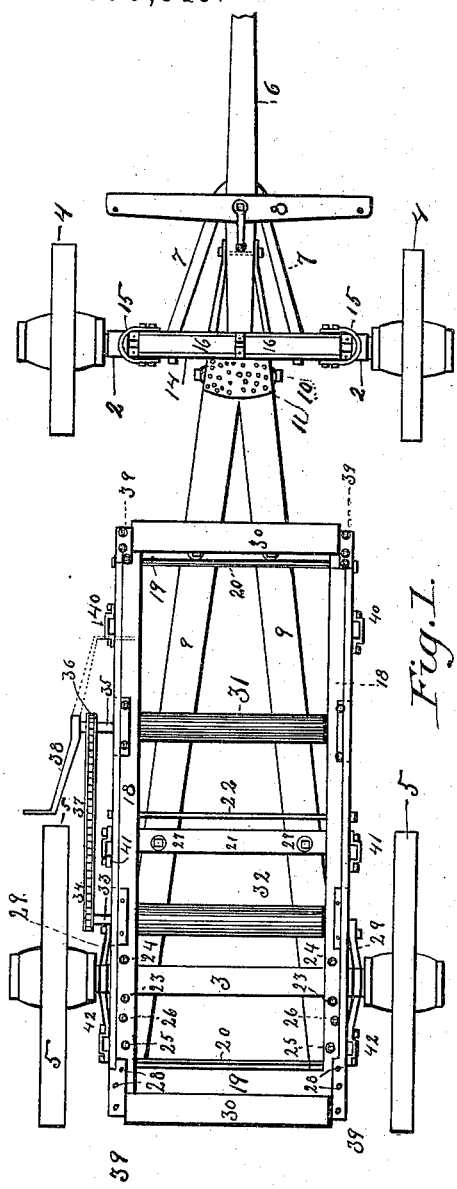
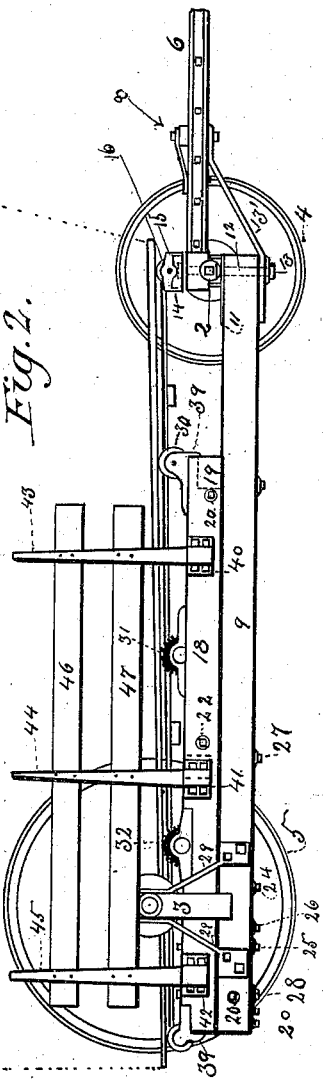
Fig. 1.
Fig. 2.
Witnesses:
W. A. Roberts
Richard Paul
Inventor:
Eugene O. McGlauflin
By Paul O. Hawley
His Attorneys.

(No Model.)  E. O. McGLAUFLIN.  2 Sheets—Sheet 2.
ROLL-OFF LUMBER WAGON.

No. 600,646.  Patented Mar. 15, 1898.

Witnesses
W. A. Roberts
Richard Paul

Inventor
Eugene O. McGlauflin
By Paul O. Hawley
His Attorneys.

UNITED STATES PATENT OFFICE.

EUGENE O. McGLAUFLIN, OF ANOKA, MINNESOTA.

ROLL-OFF LUMBER-WAGON.

SPECIFICATION forming part of Letters Patent No. 600,646, dated March 15, 1898.

Application filed April 9, 1897. Serial No. 631,349. (No model.)

*To all whom it may concern:*

Be it known that I, EUGENE O. MCGLAUFLIN, of Anoka, county of Anoka, State of Minnesota, have invented certain new and useful Improvements in Roll-Off Lumber-Wagons, of which the following is a specification.

My invention relates to wagons for conveying lumber from place to place; and the object I have in view is to provide a strong durable frame upon which the lumber can be easily loaded; and a further and more particular object is to provide means for quickly removing the lumber from the wagon and without danger to the life and limb of the driver.

My invention consists generally in a wheeled frame, a rocker carried by the front axle, a series of rolls mounted upon said frame and rocker and upon which the lumber rests when the wagon is in use, and means connecting two or more of said rolls, whereby the same may be revolved in their bearings, all as hereinafter described, and particularly pointed out in the claims.

Figure 4:
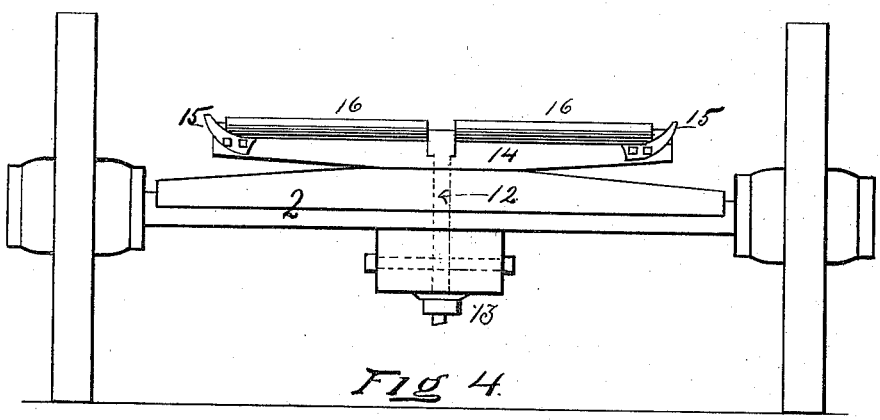
Figure 3:
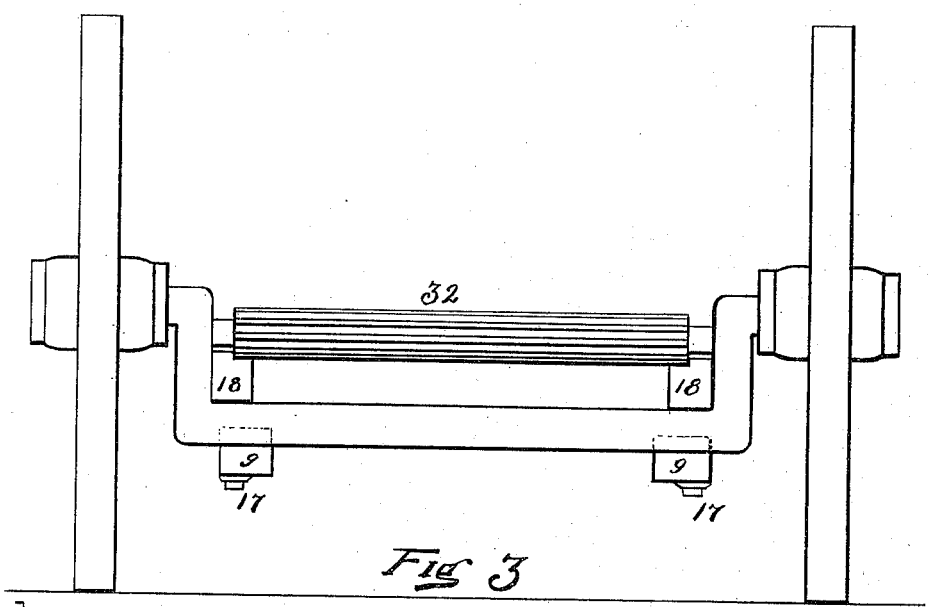

In the accompanying drawings, forming part of this specification, Figure 1 is a plan view of a lumber-wagon embodying my invention. Fig. 2 is a side elevation of the same, the wheels being removed. Fig. 3 is an elevation of the rear end of the wagon. Fig. 4 is an end elevation of the forward wheels separated from the wagon-frame proper.

In the drawings, 2 and 3 represent, respectively, the forward and rear axles supported by the wheels 4 and 5. The front axle 2 is provided with the usual tongue or pole 6, secured to the axle by the brace-rods 7 and carrying the usual whiffletree 8. The front and rear axles are connected by the timbers 9, having their forward ends fastened securely together by means of the bolt 10 and the plate 11. A king-bolt 12 passes down through the forward axle 2, through the plate 11, and the ends of the timbers 9, and is provided on its lower end with a washer and suitable nut 13, by means of which the ends of the timbers 9 are securely held in position beneath the axle 2, and at the same time the axle is permitted to swing freely on the king-bolt as a pivot. A rod 13' connects the forward end of the king-bolt with the under side of the tongue 6, as shown in Fig. 2. The king-bolt 12 also passes through a rocker 14, provided on the upper side of the axle 2, and said rocker is provided at each end with the clevis-irons 15, to which chains may be connected and the lumber securely fastened in position upon the wagon. The rocker 14 is provided on its upper surface with the rolls 16, one upon each side of the king-bolt 12, said rolls being mounted in suitable bearings and adapted to move freely back and forth therein. The rear axle 3 is provided with an offset portion, as shown in Fig. 3, so that the rear end of the frame of the wagon is brought considerably nearer the ground than the hubs of the rear wheels, which support the same. The timbers 9 diverge from the forward to the rear end of the wagon, and the rear ends of said timbers pass beneath the offset portion of the axle 3 and are securely fastened thereto by means of the bolts 17, as shown in Figs. 2 and 3. Upon the rear axle 3 I arrange the frame of the wagon, comprising the side timbers 18, connected at each end by the cross-bars 19 and tie-rods 20 and at the middle by the cross-bar 21 and the tie-rod 22. The side timbers 18 are secured to the rear axle by the bolts 23 and 24 and to the rear ends of the timbers 9 by the bolts 25 and 26. The cross-bar 21 is secured to the timbers 9 by the bolts 27 and the cross-bar 19 by the bolts 28. The timbers 9 and the frame are therefore firmly secured together and are in no danger of becoming separated while the wagon is in use. The rear ends of the timbers 18 rest upon the upper side of the rear axle 3, and the braces 29, provided on each side of the wagon, aid in holding said timbers firmly in position on the axle.

Upon the upper surface of the timbers 18, at each end thereof, I provide the rollers 30, mounted in suitable bearings and adapted to roll easily in either direction. I also provide on the upper surface of the timbers 18 the fluted rollers 31 and 32, also mounted in bearings on the timbers 18 and projecting above the upper surface of the same. The roller 32 is provided with an axle 33, which projects beyond the outside surface of the timber 18 and is provided on its outer end with a sprocket-wheel 34. The roller 31 is provided with an axle 35, which likewise projects beyond the timber 18 and is provided with a sprocket 36, over which a chain 37 passes, connecting said sprocket with the sprocket 34. A crank 38 is provided on the outer end of the axle 35 to permit the rolls 31 and 32 to be operated in either direction at will. The frame of the wagon is strengthened by the corner-irons 39, and the timbers 18 are provided on each side of the wagon with the sockets 40, 41, and 42 to receive the lower ends of the sticks or bars 43, 44, and 45, which are connected by the slats 46 and 47. By this means the lumber when piled upon the wagon is prevented from sliding off the side of the wagon while it is being transported from place to place, the rear axle being offset so that the frame upon which the lumber is piled is below the level of the hubs of the wheels supporting the rear axle and also lower than the rollers carried upon the rocker 14. This construction gives the frame of the wagon a backward incline, so that lumber will slide easily back over the rolls and onto the ground when it is desired to unload the same. At such time the binding-chains are loosened and the operator grasps the handle 38, turning the fluted rollers in their bearings, and as the corrugations in the surface of said rollers engage the under side of the load of lumber as the rolls are turned the lumber will be gradually moved back and off the rear end of the wagon-frame onto the ground. A large load of lumber may thus be quickly unloaded without any danger of breaking the wagon or in any way injuring the life or limb of the operator. If preferred, the rolls mounted on the forward axle may be arranged upon the same level as those arranged upon the frame that is supported by the rear axle, and in order that articles of merchandise or machinery may be transported upon the wagon I may provide a floor to fit in between the rollers and lower than the upper surface of the same. This floor is preferably constructed so that it can be easily and quickly removed to adapt the wagon for transporting lumber.

In one of the side timbers of the frame of the wagon I provide a hole or opening to receive the handle end of the crank 38, so that before loading the lumber on the wagon the position of the crank, as shown in the drawings, may be reversed and the handle end inserted into the hole in the side timber, thus preventing the rolls from turning until such time as it is desired to remove the lumber from the wagon. With this arrangement the mechanism for operating the fluted rolls is securely fastened while the load of lumber is being transported from place to place.

Having thus described my invention, I claim as new and desire to secure by Letters Patent—

1. In a lumber-wagon, the combination, with the forward and rear axles, rolls upon said forward axle, means connecting said axles, the rack or frame mounted upon said rear axle, the rolls in the bearings in said frame, means for operating said rolls, and said rear axle being provided with an offset portion whereon said rack or frame is supported, for the purpose set forth.

2. A lumber-wagon, comprising forward and rear axles, wheels therefor, the offset portion provided in said rear axle, timbers 9 pivotally secured to the forward axle, the frame supported upon said rear axle and said timbers, the roll provided thereon and on said forward axle, and the timbers 9 being arranged to diverge from the forward axle to a point beneath said offset portion, and means for securing the same thereto, substantially as described.

3. A lumber-wagon, comprising forward and rear axles, wheels therefor, the offset portion provided in said rear axle, the substantially V-shaped frame composed of timbers 9 having their forward ends secured together and pivotally supported beneath the forward axle, and their rear ends supported beneath said offset portion, the frame supported by said offset portion and by said timbers 9, the rolls mounted in bearings in said frame and upon said forward axle, some of said rolls being fluted or corrugated and means for moving or locking the same, substantially as described.

In testimony whereof I have hereunto set my hand this 29th day of March, A. D. 1897.

EUGENE O. McGLAUFLIN.

In presence of—
A. C. PAUL,
RICHARD PAUL.